United States Patent [19]

Meli et al.

[11] Patent Number: 5,748,364

[45] Date of Patent: May 5, 1998

[54] AMPLIFIED TELECOMMUNICATION SYSTEM FOR WAVELENGTH-DIVISION MULTIPLEXING TRANSMISSIONS

[75] Inventors: Fausto Meli, Piacenza; Giacomo Stefano Roba, Cogoleto, both of Italy

[73] Assignee: Pirelli Cavi S.p.A., Milan, Italy

[21] Appl. No.: 788,457

[22] Filed: Jan. 29, 1997

Related U.S. Application Data

[63] Continuation of Ser. No. 367,719, Jan. 3, 1995, abandoned.

[30]   Foreign Application Priority Data

Apr. 14, 1994  [IT]  Italy .................... MI94A0712

[51] Int. Cl.$^6$ ........................................ H01S 3/00
[52] U.S. Cl. ........................................ 359/341; 372/6
[58] Field of Search ........................ 359/341; 372/6; 385/142, 141

[56]   References Cited

U.S. PATENT DOCUMENTS

| | | |
|---|---|---|
| 3,731,226 | 5/1973 | Snitzer et al. . |
| 4,194,807 | 3/1980 | Gliemeroth . |
| 4,666,247 | 5/1987 | MacChesney et al. . |
| 5,058,976 | 10/1991 | Digiovanni et al. . |
| 5,117,303 | 5/1992 | Desurvire et al. . |
| 5,225,922 | 7/1993 | Charplyvy et al. . |
| 5,282,079 | 1/1994 | Laming et al. . |
| 5,378,664 | 1/1995 | Becker et al. . |
| 5,406,404 | 4/1995 | DiGiovanni et al. . |
| 5,412,672 | 5/1995 | Ainslie et al. . |
| 5,563,979 | 10/1996 | Bruce et al. ............... 385/142 |

FOREIGN PATENT DOCUMENTS

| | | |
|---|---|---|
| 0441211 | 1/1991 | European Pat. Off. . |
| 0426222 | 1/1994 | European Pat. Off. . |
| 0417441 | 2/1994 | European Pat. Off. . |

OTHER PUBLICATIONS

C.C. Larsen, "Al–La–Doped Optical Amplifier Fiber With Extremely Low Hydrogen Sensitivity," LYCOM A/S, NKT ALLÉ 75, DK–2605 Brondby, Denmark, ThC 12.1, ECOC, pp. 1–4 (1993).

Edagawa et al., Non–Regenerative Optical Transmission Experiment Using 12 Er–Doped Fibre Amplifiers, KDD Meguro R&D Labs, PDA–8, pp. 33–36.

Pálsdóttir et al., "Short Erbium Doped Fiber Amplifiers Optimized For High Output Power," NKT Allé 75, DK–2605 Brondby, Denmark, Tu4, ECOC, pp. 181–184 (1993).

Nakazawa et al., "Lanthanum Codoped Erbium Fibre Amplifier," Electronics Letters, vol. 27, No. 12, June 6, 1991, pp. 1065–1067.

Ibrahim et al., "Comparison Between Erbium–Doped Fluoride and Silica Fiber Amplifiers in an AM–CATV Transmission System," IEEE Photonics Technology Letters, vol. 5, No. 5, May 1993, pp. 5.

Hwang et al., Guidelines for Optimizing System Performance for 20 WDM Channels Propagating Through a Cascade of EDFA's, IEEE Photonics Technology Letters, vol. 5, No. 10, Oct. 1993, pp. 1190–1193.

Chraplyvy et al., "End–to–End Equalization Experiments in Amplified WDM Lightwave Systems," IEEE Photonics Technology Letters, vol. 4, No. 4, Apr. 1993, pp. 428–429.

Yamamoto et al., "Wide Band Erbium–Doped Fluoride Fiber Optical Amplifier at 2.7 mm With Fluoride Fiber Wavelength–Division Multiplex Coupler," Jpn. J. Appl. Phys., vol. 32, Part 2, No. 1A/B, (1993), pp. L62–64.

Lumholt et al., "Er–La doped fibre amplifier, pumped at 1.47 um, " ECOC, pp. 285–288.

*Primary Examiner*—Mark Hellner
*Attorney, Agent, or Firm*—Finnegan, Henderson, Farabow, Garrett & Dunner, L.L.P.

[57]   ABSTRACT

The present invention relates to an optical amplifier and a telecommunication system including a plurality of the optical amplifiers connected in cascade, particularly adapted for a wavelength division multiplexing transmission, in which a combination of dopants in the active fiber core of the optical amplifiers enables a high signal/noise ratio to be achieved for all channels in a predetermined wavelength band, even in the presence of several simultaneously fed signals.

39 Claims, 8 Drawing Sheets

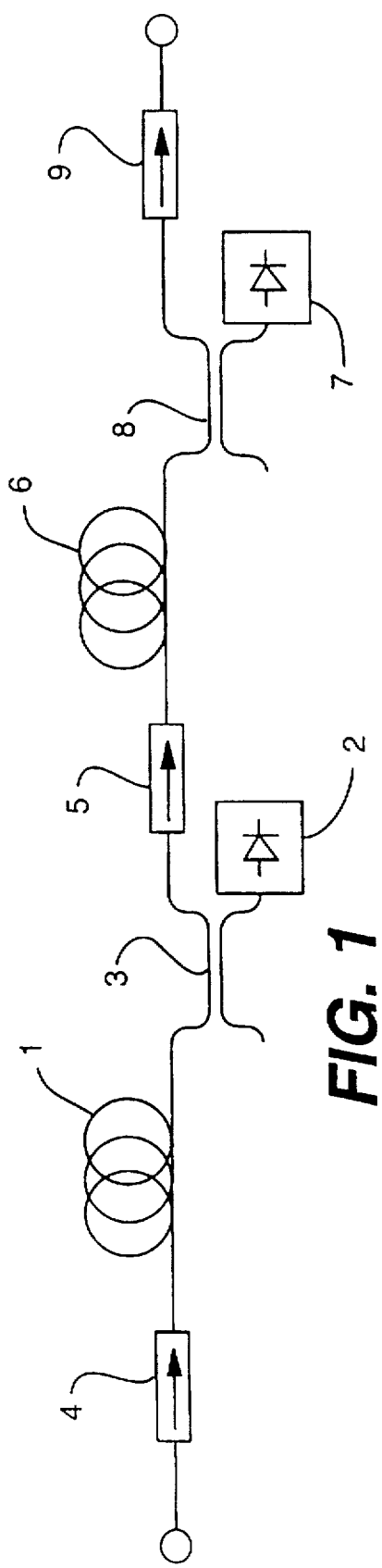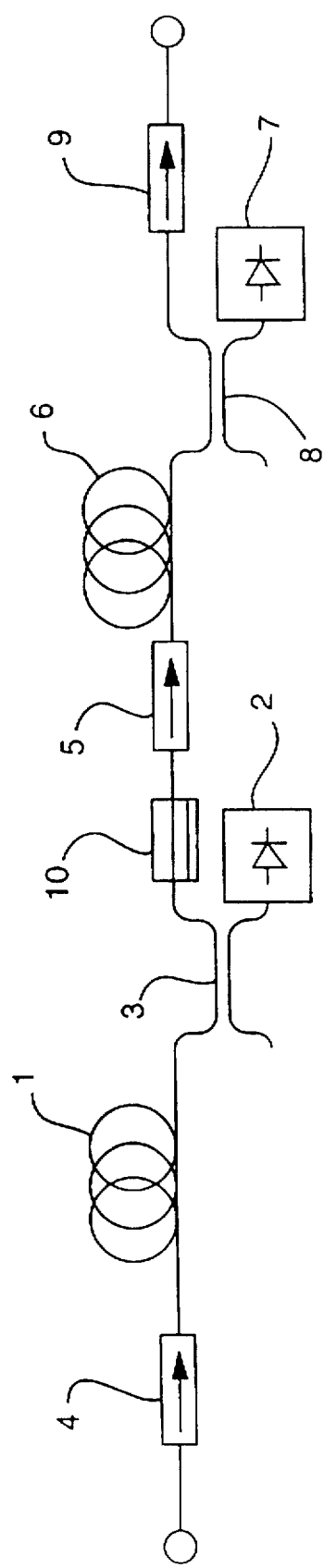

AMPLIFIED TELECOMMUNICATION SYSTEM FOR WAVELENGTH-DIVISION MULTIPLEXING TRANSMISSIONS

This is a continuation of application Ser. No. 08/367,719, filed Jan. 3, 1995 now abandoned.

BACKGROUND OF THE INVENTION

1. Field of the Invention

The present invention relates to a telecommunication system including optical amplifiers, particularly adapted for a wavelength-division multiplexing transmission (hereinafter "WDM transmission").

2. Discussion of the Related Art

For WDM transmission several channels or several transmission signals independent of each other are required to be sent over the same line, for example an optical fiber, by multiplexing in the optical frequency region. The transmitted channels can be both digital and analog and are distinguished from each other because each is associated with a specific frequency.

In this kind of transmission, the different channels must be substantially equivalent to each other, that is none of them must be more or less privileged relative to the others, in terms of signal level or quality.

Amplifiers, in particular optical amplifiers, are required to substantially have the same response for all transmitted channels; in addition, in order to transmit a high number of channels, the band in which the amplifier can operate must be wide.

Optical amplifiers are based on the properties of a fluorescent dopant, and in particular erbium, introduced as the dopant into an optical fiber core. When erbium is excited by administration of optical pumping energy, it has a high emission in the wavelength range corresponding to the minimum light attenuation in silica-based optical fibers. When an erbium-doped fiber, where erbium is held to an excited state, is passed through by an optical signal having a wavelength corresponding to such a high emission, the signal causes the transition of the excited erbium atoms to a lower level and an optical emission is stimulated to the wavelength of the signal itself, thereby producing signal amplification.

Starting from the excited state, the decay of the erbium atoms takes place spontaneously and this generates a random emission constituting "background noise" overlapping the stimulated emission corresponding to the amplified signal. The optical emission generated by admitting optical pumping energy to the "doped" or active fiber can take place at several wavelengths characteristic of the doping substance to cause a fluorescence spectrum in the fiber.

To achieve the greatest amplification signal by a fiber of the above type and a high signal/noise ratio suitable for correct reception of the signal itself, an optical telecommunications signal is usually used which is generated by a laser emitter at a wavelength corresponding to the maximum, in the intended band, of the fluorescence spectrum curve in the fiber incorporating the employed doping substance, or emission peak.

Erbium-doped fibers, on the other hand, have an emission spectrum with a peak of limited width the features of which vary depending on the glass system into which erbium is introduced as the dopant. The spectrum area of such a high intensity is in a wavelength range contiguous to the above peak, within the wavelength range of interest, makes the use of optical amplifiers for amplifying signals in a wide band possible. Known erbium-doped fibers, however, exhibit an uneven emission spectrum, which reduces the possibility of achieving a uniform amplification over the whole selected band.

In order to achieve a substantially "flat" gain curve, that is as constant a gain as is possible at the different wavelengths, noise sources due to spontaneous emission, are eliminated by filtering elements such as those described in patents EP 426,222, EP 441,211 and EP 417,441 in the name of the same Applicant.

In such patents, however, the amplifiers' behavior in the presence of wavelength division multiplexing is not described and in addition the behavior in the presence of several amplifiers connected to each other in cascade has not been taken into account. The emission spectrum profile greatly depends on the dopants present in the fiber core in order to increase the refraction index thereof, as shown for example in U.S. Pat. No. 5,282,079, in which the fluorescence spectrum of an alumina/erbium-doped fiber is shown to have a less defined peak than a germanium-erbium-doped fiber and to be shifted to lower wavelengths (the maximum is at about 1532 nm); such a fiber had a numerical aperture (NA) of 0.15.

In ECOC '93, ThC 12.1, pages 1–4, a fiber for an optical amplifier doped with Al and La and having a very low responsiveness to hydrogen is disclosed. The described Al-doped fiber has a numerical aperture of 0.16 and the Al-La-doped fiber has a numerical aperture of 0.30. ECOC '93, Tu 4, pages 181–184 describes optical amplifiers having erbium-doped fibers and experiments that were carried out with these fibers. The cores were doped with aluminium, aluminium/germanium and lanthanum/aluminium and the best results appear to have been reached with Al/La-co-doped fibers.

Electronics Letters, 6 Jun. 1991, vol. 27, No. 12, pages 1065–1067, points out that in optical amplifiers having an erbium-doped fiber, co-doping with alumina enables a larger and flatter gain profile to be reached. Also described in the article are amplifiers having an alumina-doped, germanium-doped and erbium-doped fiber as compared with amplifiers having a lanthanum-doped, germanium-doped and erbium-doped fiber and it is stated that the greatest gain flattening is obtained by the former.

In ECOC '91, TuPS1-3, pages 285–288 a fiber of the $Al_2O_3$—$SiO_2$ type doped with Er and La is described for the purpose of obtaining a higher refractive index and reducing the formation of clusters containing erbium ions. The fluorescence and absorption spectra of the Er/La-doped fiber have proved to be very similar to those of an erbium-doped $Al_2O_3$—$SiO_2$ fiber. A numerical aperture (NA) of 0.31 has been achieved with an erbium concentration of $23.10^{18}$ $cm^{-3}$.

In ECOC '89, Post-Deadline Papers, PDA-8, pages 33–36, 10–14 Sep. 1989, describes experiments made with twelve optical amplifiers connected in cascade using an erbium-doped fiber. A single signal wavelength of 1.536 μm has been used, and it is pointed out that signal wavelength control in the order of 0.01 nm is required for stable operation, in view of the fact that BER (Bit Error Rate) characteristics rapidly decay on changing the signal wavelength.

U.S. Pat. No. 5,117,303 discloses an optical transmission system comprising locked optical amplifiers that, based on the stated calculations, when operating in a saturated manner give a high signal/noise ratio. The described amplifiers include an erbium-doped fiber having an $Al_2O_3$—$SiO_2$ core and the use of filters is provided. The calculated performance is achieved at a single wavelength and a signal supply in a wide wavelength band offering the same performance is not provided.

OBJECTS AND SUMMARY OF THE INVENTION

An object of the present invention is an active fiber for an optical amplifier capable of wavelength-division multiplexing transmission.

Another object of the present invention is an active-fiber optical amplifier capable of efficiently amplifying signals of different frequencies within a band used for optical transmission.

A further object of the present invention is an optical transmission system capable of simultaneously transmitting signals of different wavelengths without significant signal loss.

The present invention contemplates an active optical fiber, for use in a laser-pumped optical telecommunications amplifier comprising a core, at least one main fluorescent dopant in the core, and at least one secondary dopant in the core, the main dopant and the secondary dopant having functional relation with each other such that the emission curve of the fiber in a predetermined wavelength band includes a plurality of emission zones, and in the presence of optical pumping energy supplied to the fiber, the emission curve is clear of depressions of a value higher than 1 dB relative to the emission value in at least one of the adjacent zones in the band.

The present invention also contemplates an active-fiber optical amplifier, comprising at least one length of silica-based active fiber, a pump for the active fiber to supply optical pumping power at a pumping wavelength to the active fiber, a coupler within the active fiber to couple the optical pumping power and at least one transmission signal, at a transmission wavelength included in a predetermined transmission band to the active fiber, the active fiber having a core doped with at least one main fluorescent dopant and at least one secondary dopant, the main fluorescent dopant and the secondary dopant being in functional relation with each other such that the maximum gain variation between two signals at different transmission wavelengths in the band measured at an input power $\leq -20$ dBm, is lower than 2.5 dB without filtering means associated with the active fiber.

The present invention further contemplates a telecommunications system for transmitting optical signals in a predetermined wavelength band, from a transmission station to a receiving station, comprising an optical fiber adapted to connect the transmission station and receiving station, and at least two active-fiber optical amplifiers connected in series along the optical fiber, at least one of the optical amplifiers comprising a silica-based active optical fiber having a core doped with at least one main fluorescent dopant and at least one secondary dopant in appropriate amounts such that the receiving station receives signals with at optical signal/noise ratio, measured at a 0.5 nm filter width, not lower than 15 dB for signals of a wavelength included in the band.

BRIEF DESCRIPTION OF THE DRAWINGS

The manner by which the above objects, features, and advantages of the present invention are attained will be explained in detail in the following detailed description when considered in view of the accompanying drawings, wherein:

FIG. 1 shows a diagram of an optical amplifier;

FIG. 2 is a diagram of an optical amplifier having a notch filter;

DETAILED DESCRIPTION

Figure 3:
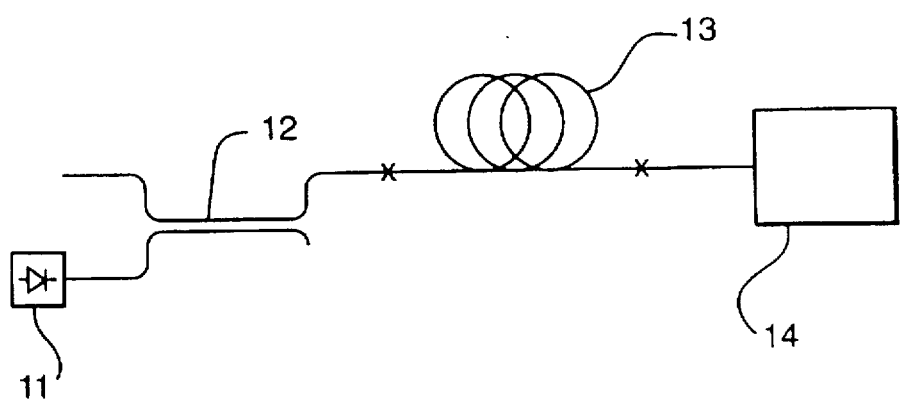
FIG. 3 is a diagram of an experimental configuration for determination of the spectral emission graphs for different types of optical fiber.

According to the present invention, it has been found that a particular combination of dopants in the core of an active optical fiber makes it possible to produce a fiber having a high numerical aperture together with an emission spectrum the features of which enable optical amplifiers to be made which, particularly in a wavelength multiplexing system, give a uniform response to the different wavelengths in the provided wavelength range. This is true for the case of a single amplifier and also the case of several amplifiers connected in cascade.

The present invention, in one aspect, relates to a method of achieving the control of the optical signal/noise ratio on reception, in a predetermined wavelength band, in an optical telecommunication system. The system includes an optical transmitter, an optical receiver, an optical fiber line connecting the transmitter and receiver, and at least one active-fiber optical amplifier interposed along the line. The active fiber exhibits an emission curve having a high-emission zone in a wavelength range including the predetermined wavelength band, inside which an emission depression relative to the adjacent zones is present. An improvement includes eliminating or reducing the depression in the emission curve through selection and proper dosing of the dopants in the active fiber.

In particular, the predetermined wavelength band is between 1530 and 1560 nm and preferably between 1525 and 1560 nm. Preferentially, the optical signal/noise ratio, measured at a 0.5 nm filter width, is greater than 15 dB. In a preferred embodiment, the system is comprised of at least two active-fiber optical amplifiers interposed in series along the optical fiber line.

In a preferred embodiment of the method of the invention, the dopant selection in the fiber comprises the use of a main fluorescent dopant and at least one secondary dopant interacting with the main dopant in the glass matrix of the active fiber, for reducing the depression to a value lower than 1 dB relative to the emission value in at least one of the adjacent zones in the band. Erbium (in the form of an oxide) is preferably selected as the main dopant and germanium, aluminium, and lanthanum (in the form of the respective oxides) are selected as secondary dopants.

The present invention also relates to an optical telecommunication method comprising the steps of generating at least one optical signal at a predetermined wavelength in a wavelength band, supplying the signal to an optical fiber of an optical telecommunication line, amplifying the optical signal at least once by at least one active-fiber optical amplifier, and receiving the signal through a receiver. The active fiber of at least one of the amplifiers comprises a main fluorescent dopant and at least one secondary dopant interacting with the main dopant in the glass matrix of the active fiber to generate an amplification gain of the optical signal at the predetermined wavelength in the active-fiber optical amplifier, measured at an input power ≦−20 dBm, which differs by less than 1.6 dB from the corresponding gain of a signal at a different wavelength in the band, in the absence of filter means.

According to a third aspect, the method of the invention is characterized in that the optical signal/noise ratio at the receiver, measured at a 0.5 nm filter width is not lower than 15 dB, both for a single signal in the band, and in the presence of two or more signals at different wavelengths included in the band, simultaneously supplied to the amplifier, for each of the optical signals. In particular, the method includes the step of amplifying the optical signal at least twice by means of respective active-fiber optical amplifiers interposed in series along the optical fiber line.

In the telecommunication methods of the present invention, the active-fiber optical amplifier preferably comprises an active fiber having a core doped with erbium as the main fluorescent dopant, the core being further doped with at least two secondary dopants interacting with the main dopant and more preferably consisting of aluminium, germanium, and lanthanum, in the form of oxides.

The present invention in a fourth aspect relates to a telecommunication system comprising a transmission station generating optical signals in a predetermined wavelength band, a receiving station, an optical fiber connecting line between the transmission station and receiving station, and at least two active-fiber optical amplifiers connected in series along the line. At least one of the optical amplifiers comprises a silica-based active optical fiber having a core doped with at least one main fluorescent dopant and at least one secondary dopant, operatively connected with each other in such a manner that they supply the receiving station with an optical signal/noise ratio, measured at a 0.5 nm filter width, not lower than 15 dB for signals of a wavelength included in the band, both for a single signal in the band and in the presence of at least two signals of different wavelengths included in the band and simultaneously supplied to the amplifier.

Preferably, the main fluorescent dopant of the glass core is erbium and the secondary dopants are aluminium, germanium, and lanthanum. Conventionally, the erbium, aluminium, germanium, and lanthanum are described to be present in the form of their respective oxides, as obtained by known manufacturing methods as described hereinafter. The predetermined transmission band is preferably included between 1530 and 1560 nm, and the line according to the invention is preferably comprised of at least three optical amplifiers connected in series with at least one of the amplifiers having an active fiber the core of which is doped with aluminium, germanium, lanthanum and erbium, in their oxide forms.

Within the present invention, an active-fiber optical amplifier includes at least one length of silica-based active fiber, pumping means for the active fiber, adapted to supply optical pumping power at a pumping wavelength, and means for coupling within the active fiber the optical pumping power and one or more transmission signals, at transmission wavelengths included in a predetermined transmission band. The active optical fiber has a doped core with at least one main fluorescent dopant and at least one secondary dopant, in functional relation with each other to such a degree that the maximum gain variation between two signals at different transmission wavelengths in the band, measured at an input power ≦−20 dBm, is lower than 2.5 dB, in the absence of filtering means interposed along the active fiber.

In the amplifier, preferably the main fluorescent dopant is erbium, in the form of an oxide, and preferably the secondary dopants are aluminium, germanium, and lanthanum, in the form of oxides. In particular, the active fiber optical amplifier has an emission curve, in the predetermined wavelength band, which is substantially clear of depressions. Substantially clear of depressions means clear of portions in the desired band of the emission spectrum having lower emission than at adjacent wavelengths, where the amplification for a signal at the depression wavelength is saturated at a lower wavelength in the presence of signals at the adjacent wavelengths outside the depression. The predetermined transmission band is included between 1530 and 1560 nm and preferentially between 1525 and 1560 nm. Preferentially the active fiber has a numerical aperture greater than 0.15.

In another aspect of the present invention, an active optical fiber, suitable for optical telecommunications amplifiers, has a numerical aperture greater than 0.15 and a doped core with at least one main fluorescent dopant and at least one secondary dopant, in functional relation with each other such that the emission curve of the fiber in a predetermined wavelength band, in the presence of optical pumping energy supplied to the fiber, is clear of depressions of a value higher than 1 dB relative to the emission value in at least one of the adjacent zones in the band. Preferably, no depression is higher than 0.5 dB. In the active optical fiber, preferably the main fluorescent dopant is erbium in the form of an oxide and preferably the secondary dopants are aluminium, germanium, and lanthanum in the form of oxides. In a preferred embodiment, the lanthanum content in the fiber core expressed as an oxide, is higher than 0.1% by mole and, more preferably, equal to or greater than 0.2% by mole. The germanium content in the fiber core expressed as an oxide is preferably higher than 5% by mole and the molar ratio between the germanium content and lanthanum content in the fiber core, expressed as oxides, is included between 10 and 100 and, more preferably, is about 50. The aluminium content in the fiber core, expressed as an oxide, is preferably higher than 1% by mole and, more preferably, higher than 2% by mole. The erbium content in the fiber core expressed as an oxide is preferably between 20 and 5000 ppm by mole and more preferably between 100 and 1000 ppm by mole. Preferably, the numerical aperture of the fiber is higher than 0.18.

As shown in FIG. 1, an amplifier provided for use as a line amplifier, comprises one erbium-doped active fiber 1 and a respective pump laser 2, connected thereto by a dichroic coupler 3. An optical isolator 4 is disposed upstream of the fiber 1, in the path direction of a signal to be amplified, and a second optical isolator 5 is disposed downstream of the active fiber. Conveniently, although not necessarily, the dichroic coupler 3 is located (as shown) downstream of the active fiber 1, so that pump energy is supplied countercurrent to the signal.

The amplifier further comprises a second erbium-doped active fiber 6 coupled with the output of a pump laser 7 by means of a dichroic coupler 8, which may also provide countercurrent pumping in the example shown. A third optical isolator 9 is present downstream of the fiber 6.

The pump lasers 2, 7 are preferably of the Quantum Well type and have an emission wavelength of $\lambda_p$=980 nm, and a maximum optical power at the exit of $P_u$=80 mW. Lasers of the above type are produced by LASERTRON INC., 37 North Avenue, Burlington, Mass. (U.S.).

The dichroic couplers 3, 8 are melted-fiber couplers formed of single-mode fibers at 980 nm and made in the 1530–1560 nm wavelength band, with variations <0.2 dB in the output optical power depending on polarization. Dichroic couplers of the above type are known and may be of a type produced by GOULD Inc., Fiber Optic Division, Baymeadow Drive, Glen Burnie, Md. (U.S.) and SIFAM Ltd., Fiber Optic Division, Woodland Road, Torquay, Devon (GB).

The optical isolators 4, 5, 9 are optical isolators in which the polarization control is independent of the transmission signal polarization and have an isolation greater than 35 dB and a reflectance lower than −50 dB. A suitable isolator is a MDL I-15 PIPT-A S/N 1016 model available from ISOWAVE, 64 Harding Avenue, Dover, N.J., U.S.

FIG. 2 shows an alternative embodiment of an amplifier in which corresponding elements are referred to by the same reference numerals as in FIG. 1. In such an amplifier, the components of which have the same features as above described, a notch filter 10 is present, which is formed from an optical fiber portion having two optically-coupled cores and at a pre-selected wavelength. One of the cores is coaxial with the connected optical fibers and the core is off-center and cut off at the ends, as described in patents EP 441,211 and EP 417,441 the description of which is herein incorporated by reference. This filter is sized so that it couples in the off-center core a wavelength (or a wavelength band) corresponding to a portion of the amplifier emission spectrum cutting off the off-center core at its ends enables the wavelength transferred thereto to be dispersed in the fiber cladding so that it is no longer re-coupled in the main core.

In the example shown, the two-core filter 10 has a wavelength band coupled in the second core BW(−3 dB) of 8–10 nm and a filter length of 35 mm. The filter is sized to have maximum attenuation at the emission peak of the active fiber used. Alternatively, filters may be used which have attenuation at $\lambda_s$ 1530 nm of 5 dB or attenuation at $\lambda_s$ 1532 nm of 11 dB. Such a filter reduces the intensity of a specific wavelength zone, in particular the fiber emission peak, in order to obtain a gain curve of the amplifier that is as constant (or "flat") as possible over varying wavelengths. This requirement is particularly important in WDM telecommunications in which amplification conditions that are as uniform as possible are desired for each channel.

For use in the above described amplifiers, different types of erbium-doped active fibers were used and, the compositions and optical features of the fibers are summarized in the following table 1.

TABLE 1

| Fiber | $Al_2O_3$ wt % | (mol %) | $GeO_2$ wt % | (mol %) | $La_2O_3$ wt % | (mol %) | $Er_2O_3$ wt % | (mol %) | NA | $\lambda_c$ nm |
|---|---|---|---|---|---|---|---|---|---|---|
| A | 4 | (2.6) | 18 | (11.4) | 1 | (0.2) | 0.2 | (0.03) | 0.219 | 911 |
| B | 1.65 | (1.1) | 22.5 | (14.3) | 0 | (0) | 0.2 | (0.03) | 0.19 | 900 |
| C | 4 | (2.6) | 18 | (11.4) | 0 | (0) | 0.2 | (0.03) | 0.20 | 1025 |
| D | 4 | (2.6) | 0 | (0) | 3.5 | (0.7) | 0.2 | (0.03) | 0.19 | 900 | wherein:
wt %=(average) percent content by weight of oxide in the core
mol %=(average) percent content by mole of oxide in the core
NA=Numerical Aperture $(n1^2-n2^2)^{1/2}$
$\lambda_c$=cut-off wavelength (LP11 cut-off).

Analyses of the compositions were made on a preform (before fiber drawing) by a microprobe combined with a Hitachi scanning electron microscope (SEM). Analyses were conducted at magnifications of 1300 on discrete points disposed along a diameter and separated from each other by 200 μm. The fibers were made by the vacuum plating method, within a quartz glass tube. In the fibers, the incorporation of germanium as the dopant into the $SiO_2$ matrix in the fiber core is obtained during the synthesis step.

The incorporation of erbium, alumina, and lanthanum into the fiber core was obtained by the "solution doping" technique, in which an aqueous solution of the dopant chlorides is put into contact with the synthesis material of the fiber core, while it is in a particulate state (also called soot), before consolidation of the preform.

In particular, one or more cladding layers are first deposited on the inside surface of the substrate tube in a lathe, following which silica core layers are deposited at a reduced temperature to form a partially sintered porous soot. The alumina and erbium (and lanthanum in this case) dopants are then introduced by removing the thus formed tube from the lathe and soaking the core layers in an aqueous or alcoholic solution of aluminium, erbium, and lanthanum salts to ensure saturation of the porous soot. The tube is then replaced in the lathe, the core layers are dried and fused, and the tube collapsed. Fibre drawing from the thus formed preform is performed in a conventional manner.

More details on the solution doping technique can be found for example in U.S. Pat. No. 5,282,079.

The greater numerical aperture value (NA) of fiber A relative to the comparison fibers was caused by the fact that, in making the fiber core, the modification of the reagent flow previously adopted for making fiber C (Al/Ge/Er) was omitted, in particular, the germanium supply was not closed. The subsequent incorporation of lanthanum and aluminium by solution doping brought the value of the refractive index of the core higher than expected, in addition to the unexpected advantages achieved in terms of amplification and transmission to be described.

Figure 4:
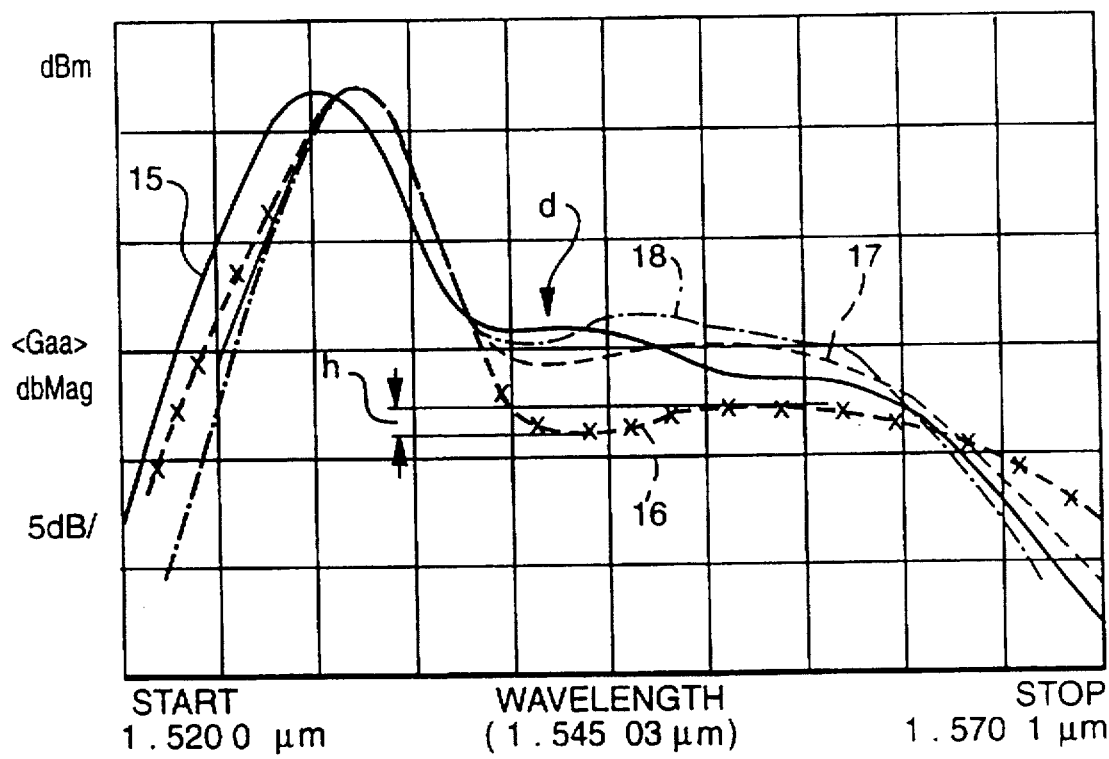
FIG. 4 shows the spectral emissions for different types of active fibers as determined by adopting the experimental configuration in FIG. 3.

The experimental configuration adopted for determining the spectral emission of the fibers is diagrammatically shown in FIG. 3, and the spectral emission graphs measured on the active fibers A, B, C, D are reproduced in FIG. 4.

A pump laser diode 11, at 980 nm, was connected through a 980/1550 dichroic coupler 12 to the active test fiber 13, and the fiber emission was detected through an optical spectrum analyzer 14. The laser diode 11 had a power of about 60 mW (in the fiber 13). The active fiber 13 had a length corresponding to most efficient amplification for the adopted pump power. All the fibers had the same erbium content with lengths of about 11 m. For different erbium contents in the fibers, an appropriate length can be determined by adopting criteria known to a person skilled in the art. The optical spectrum analyzer was a TQ8345 model produced by ADVANTEST CORPORATION, Shinjuku—NS Bldg., 2-4-1 Nishi-Shinjuku, Shinjuku-ku, Tokyo (JP).

Measurements were carried out by pumping the fiber at 980 nm and detecting the spontaneous emission spectrum of the fiber. The results are shown in FIG. 4 wherein curve 15 corresponds to fiber A, curve 16 corresponds to fiber B, curve 17 corresponds to fiber C, and curve 18 corresponds to fiber D. As noted from the graphs, the spectrum emissions from fibers B, C, D have main peaks of great intensity with a maximum at about 1532.5 nm and a subsequent zone of high emission at higher wavelengths, until about 1560–1565 nm, inclusive of a secondary greatly broadened peak.

Comparing curves 16 and 17 (fibers B and C, respectively), it can be seen that a greater alumina content in the fiber raises the level of the high-emission zone, and the substitution of lanthanum for germanium (fiber D, curve 18) enables a still higher level to be reached in the 1535–1560 nm range. On the other hand, in each of fibers B, C, and D, the presence of a depression was observed in a zone d in the spectrum (localized between about 1535 and 1540 nm), included between the main emission peak and contiguous thereto, and the secondary emission peak. The depression indicates an emission value lower by at least 2 dB than the maximum emission value in the adjacent zones (that is both the main peak and the secondary peak), as shown in the figure by reference h for curve 16 alone, but clearly identifiable for curves 17 and 18 too.

On the contrary, curve 15 shows that under the experimental conditions shown, fiber A in zone d does not show a significant depression in the spectrum (or, where a depression is detectable, it is at all events lower than about 0.5 dB). Curve 15 also shows that the maximum-emission peak of fiber A is at lower wavelengths than fibers B, C, and D, being localized at about 1530 nm, and that the fiber holds a high emission level as far as close to 1520 nm.

Figure 5:
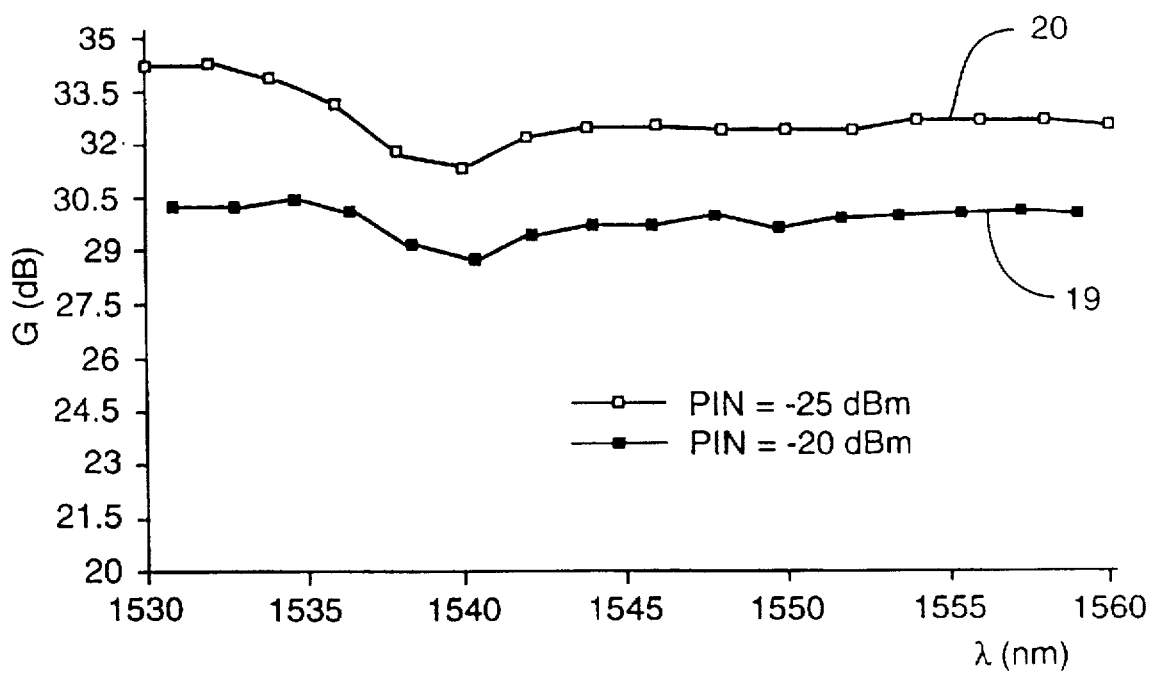
FIG. 5 shows the gain curves of an amplifier of FIG. 1, for signals at different wavelengths and two different levels of input power, when the fiber of the amplifier is made in accordance with the present invention.
Figure 6:
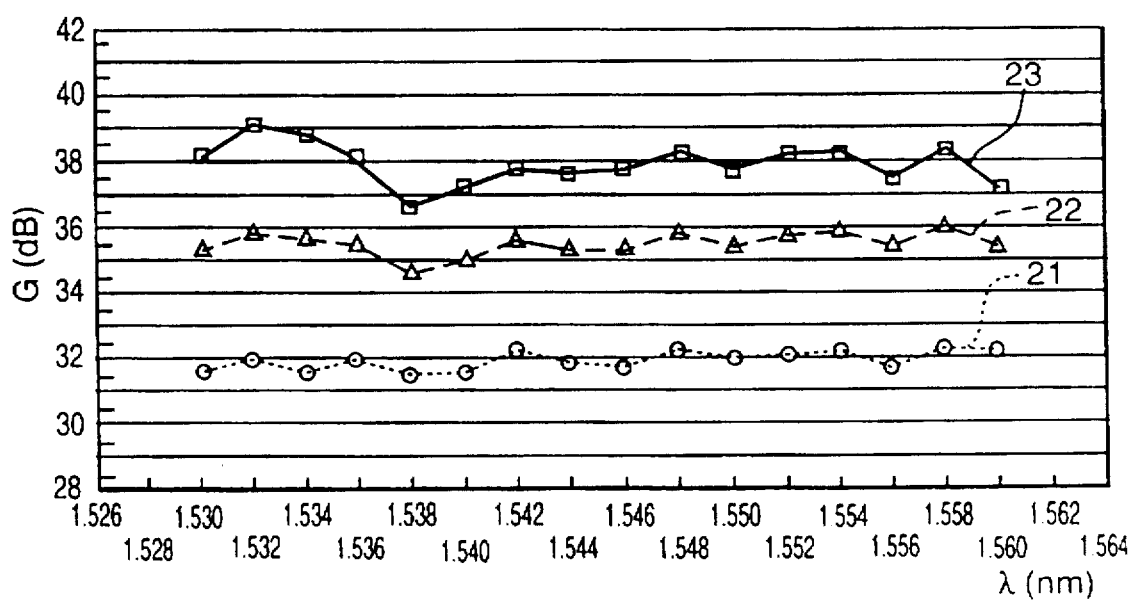
FIG. 6 shows the gain curves of an amplifier of FIG. 2, for signals at different wavelengths and three different levels of input power, when the fiber of the amplifier is made in accordance with the present invention.

Amplifiers of the structure shown in FIGS. 1 and 2 were made using fiber A. The first active fiber 1 was about 8 m long, whereas the second active fiber 6 was about 15 and 13 m long in the cases of FIG. 1 and FIG. 2, respectively. FIG. 5 shows the gain curves at different wavelengths, for two different input power levels, for the amplifier of FIG. 1, and FIG. 6 shows the gain curves at those different wavelengths for the amplifier shown in FIG. 2, for three different input power levels.

In particular, curve 19 in FIG. 5 refers to a −20 dBm input power, whereas curve 20 refers to a −25 dBm input power in the amplifier of FIG. 1. Curve 21 in FIG. 6, refers to a −20 dBm input signal power, in the amplifier of FIG. 2, curve 22 refers to a −25 dBm input signal power, and curve 23 refers to a −30 dBm input signal power.

As can be seen from the figures, in particular by comparing curves 19 and 21, corresponding to a −20 dBm power level which is of particular interest for telecommunications, both in the absence and in the presence of a filter, the use of a fiber having a core doped with alumina, germanium and lanthanum, in addition to erbium, enables a substantially flat gain curve to be achieved, particularly at the zone between 1536 and 1540 nm, which result can also be reached in the absence of a filter.

In particular, in the absence of a filter at −20 dBm, the gain difference between signals at different wavelengths was lower than 1.6 dB, whereas in the presence of a filter, at −20 dBm, the gain difference between signals at different wavelengths was lower than 0.9 dB.

Figure 7:
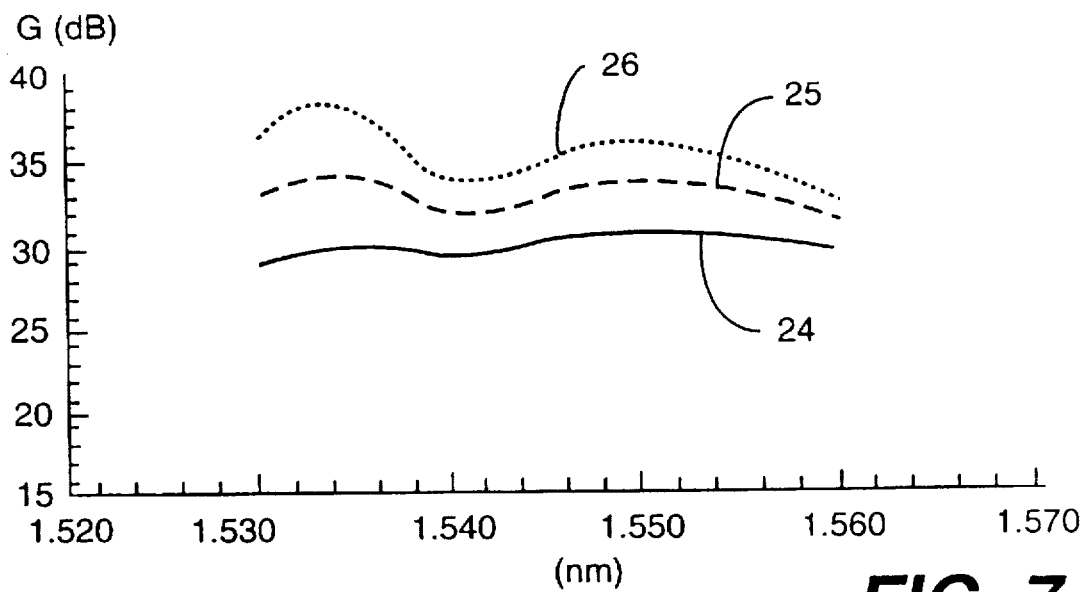
FIG. 7 shows the gain curves of an amplifier seen in FIG. 2, for signals at different wavelengths and three different levels of input power, when the amplifier uses a conventional fiber.

FIG. 7 shows the gain curves at different wavelengths for three different input power levels of an amplifier having the structure shown in FIG. 2, made from fiber C (Al/Ge/Er). In particular, curve 24 of FIG. 7 refers to a −20 data input signal power, curve 25 refers to a −25 data input signal power, and curve 26 refers to a −30 dBm input signal power. At −20 data the gain difference between signals at different wavelengths was about 2.1 dB. As discernible by comparison, fiber A (Al/Ge/La/Er) also in an amplifier devoid of filter, gives rise to a much flatter gain curve than fiber C (Al/Ge/Er) in an amplifier provided with a filter.

Figure 8:
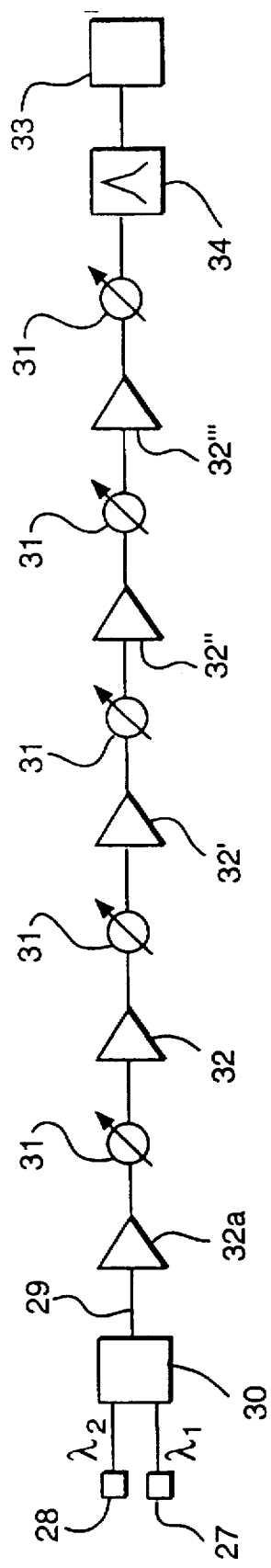
FIG. 8 shows an experimental transmission system comprising several amplifiers in cascade, in the presence of two signals at different wavelengths multiplexed in the same line.

Using the amplifiers of FIG. 1 and FIG. 2, made either of fiber A (Al/Ge/La/Er) or of fiber C (Al/Ge/Er), transmission tests over long distances with several amplifiers in cascade, that is serially connected, were carried out. One experimental configuration used is shown in FIG. 8. A first signal 27, at a wavelength $\lambda_1$=1536 nm, and a second signal 28, at a wavelength $\lambda_2$=1556 nm were fed to a fiber 29 through a multiplexer 30. One attenuator 31 was present downstream of a power amplifier 32a. Other subsequent attenuators 31, equal to each other, were disposed on the line along which four amplifiers 32, 32', 32", 32''' in succession were disposed before a receiver 33. The receiver 33 was preceded by an optical demultiplexer 34 having an interferential filter with a band width of 1 nm at −3 dB, by which the detected wavelength was selected. Signals 27, 28, generated by respective lasers, each had 0 dBm power, and the overall power multiplexed in fiber 29 was of 0 dBm (as a result of a 3 dB coupling loss).

Multiplexer 30 was a "coupler 1×2" produced by E-TEK DYNAMMICS INC., 1885 Lundy Avenue, San Jose, Calif. (U.S.). The power amplifier 32a was a fiber optic amplifier commercially available and having the following features: input power from −5 to +2 dBm; output power 13 dBm; and work wavelength 1530–1560 nm.

The power amplifier 32a was devoid of a notch filter, amplifier model, TPA/E-12 model available from the assignee of the present application was used. The amplifier utilized a C type (Al/Ge/Er) erbium-doped active optical fiber, and by power amplifier is intended to mean an amplifier operating under saturation conditions, in which the output power depends on the pumping power, as described in detail in patent EP 439,867 incorporated herein by reference. After the first attenuator 31, at the amplifier 32 input, the overall optical power was about −18 dBm.

As the attenuators 31, a model Va5 available from JDS FITEL INC., 570 Heston Drive, Nepean (Ottawa), Ontario (CA) was used and each of them supplied a 30 dB attenuation to emulate about 100 km of optical fiber. Amplifiers 32, 32', 32", 32'" were identical and each of them supplied a gain of about 30 dB for both wavelengths $\lambda_1$ and $\lambda_2$, at an overall output power of +12 dBm.

Signal 27, at wavelength $\lambda_1=1536$ nm, was a signal directly modulated at 2.5 Gbit/s, generated by a DFB laser, incorporated in the SLX-1/16 Model SDH terminal apparatus, commercially available from PHILIPS NEDERLAND BV, 2500BV Gravenhage (NL). Signal 28, at wavelength $\lambda_2=1556$ nm, was a continuous signal (CW), generated by a MG0948L3 model DFB laser, of 0 dBm power, produced by ANRITSU CORPORATION, 5-10-27 Minato-ku, Tokyo (JP). The interferential filter 34 was a TB4500 model, produced by JDS FITEL INC.

Experiment 1

In a first experiment amplifiers with fiber A (Al/Ge/La/Er) having the configuration shown in FIG. 1, i.e., devoid of the notch filter 10, were used.

Experiment 2

In a second experiment amplifiers with fiber A (Al/Ge/La/Er) having the configuration shown in FIG. 2, i.e., including a notch filter 10, were used. Through the receiver 33 the bit error rate (BER) was measured by varying of the average reception power, for the signal at the $\lambda_1$ (1536 nm) wavelength. The results are shown in the diagram in FIG. 9, in which curve 35 relates to experiment 1 and curve 36 relates to experiment 2.

Figure 9:
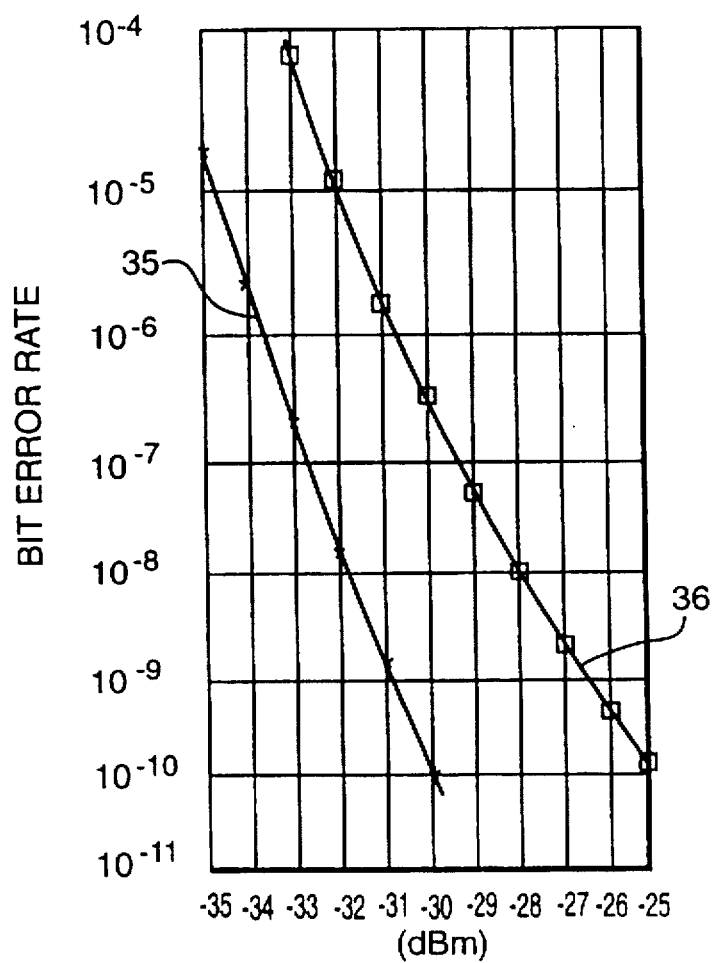
FIG. 9 shows BER (Bit Error Rate) graphs detected by using the experimental system of FIG. 8, with different amplifiers.

As shown in FIG. 9, in spite of the fact that the gain curve of a single amplifier with fiber A (Al/Ge/La/Er) provided with a notch filter was substantially identical with, and even flatter than that of a single amplifier with fiber A without a notch filter 10, in a cascade configuration, the signal at 1536 nm appeared to be penalized because it included a remarkably higher error rate at the same levels of reception power.

Experiment 3

Figure 10:
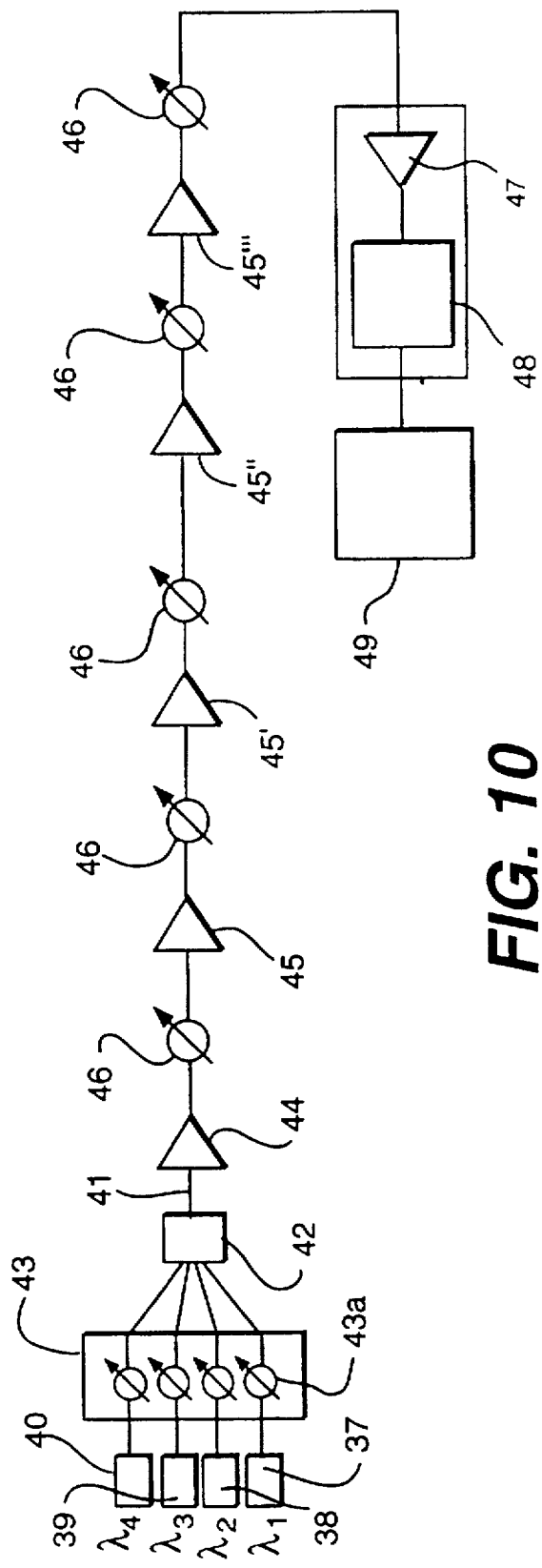
FIG. 10 shows an experimental transmission system comprising several amplifiers in cascade, in the presence of four signals at different wavelengths multiplexed in the same line.

A third experimental configuration was used as shown in FIG. 10. In this test, four signals 37, 38, 39, 40 at wavelengths $\lambda_1=1536$ nm, $\lambda_2=1556$ nm, $\lambda_3=1550$ nm and $\lambda_4=1544$ nm, respectively, were fed to a fiber 41 through a wavelength multiplexer 42. The signal level at the line entry was adjusted through a pre-equalizer 43. After passing through a power amplifier 44 the signals were sent to a line including four line amplifiers 45, 45', 45", 45'" having respective attenuators 46 interposed therebetween to simulate lengths of optical fibers. The receiving station was comprised of a preamplifier 47, an optical demultiplexer 48 and a receiver 49.

The signals 37, 38, 39 and 40 were respectively generated from a DFB laser at 1536 nm, directly modulated at 2.5 Gbit/s, incorporated in the terminal apparatus constituting the receiver 49; from a DFB laser at 1556 nm, of the continuous-emission type, produced by ANRITSU; from a DFB laser at 1550 nm, of the continuous-emission type, produced by ANRITSU; and from an ECL laser, at a variable wavelength preselected to 1544 nm, of the continuous-emission type, model HP81678A, produced by HEWLETT PACKARD COMPANY, Rockville, Md. (U.S.).

The pre-equalizer 43 included four variable attenuators 43$a$, produced by JDS, the attenuation of which was set depending on the optical power of the respective channel. The multiplexer 42 included a 1×4 splitter produced by E-TEK DYNAMICS.

The power amplifier 44 was the already described model TPA/E-12. The amplifiers 45, 45', 45", 45'" were identical with each other and each provided a gain of about 30 dB, at an overall output power of +12 dBm. The amplifiers 45 had the structure shown in FIG. 1 and utilized fiber A (Al/Ge/La/Er). The attenuators 46 each provided an attenuation of 30 dB, corresponding to about 100 km of optical fiber and were produced by the aforementioned JDS FITEL.

The preamplifier 47 was a commercially available optical preamplifier having the following features: gain 22 dB; noise factor <4.5 dB; output power from −26 to −11 dB; and work wavelength 1530–1560 nm. Model RPA/E-F, commercially available from the assignee of this application was used, and the amplifier utilized an active fiber type C (Al/Ge/Er). Preamplifier is intended to mean an amplifier sized for receiving a signal having a very low intensity (−50 dBm, for example) and amplifying it, before sending it to a receiving device, until a power level adapted to the device responsiveness is achieved.

The optical demultiplexer 48 included a wavelength-tunable Fabry-Perot filter, having a band width of 0.8 nm at −3 dB, incorporated in the preamplifier 47. For carrying out the experiment, the Fabry-Perot filter was tuned to a wavelength $\lambda=1536$ nm (identified as a critical wavelength) through a pilot tone generated from the transmitter 37. The receiver 49 was an end SDH apparatus, model SLX-1/16, commercially available from PHILIPS NEDERLAND BV, 2500BV Gravenhage (NL).

Figure 11:
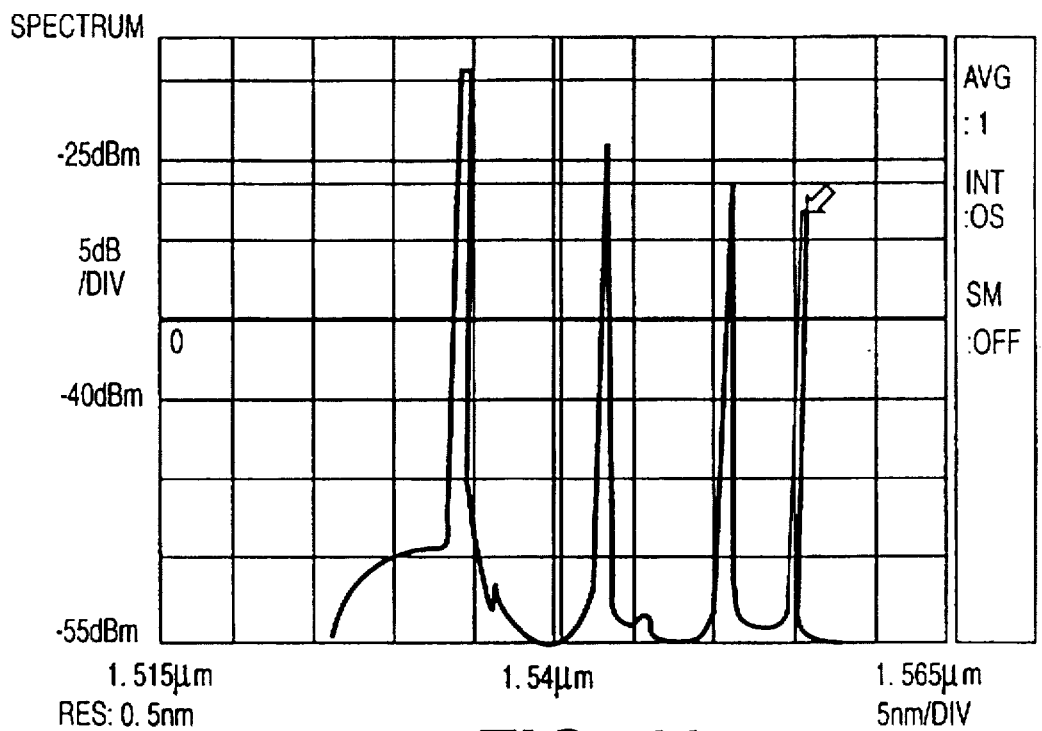
FIG. 11 shows the signal power levels at the input of the first line amplifier in the experimental system of FIG. 10, using amplifiers according to the present invention.
Figure 12:
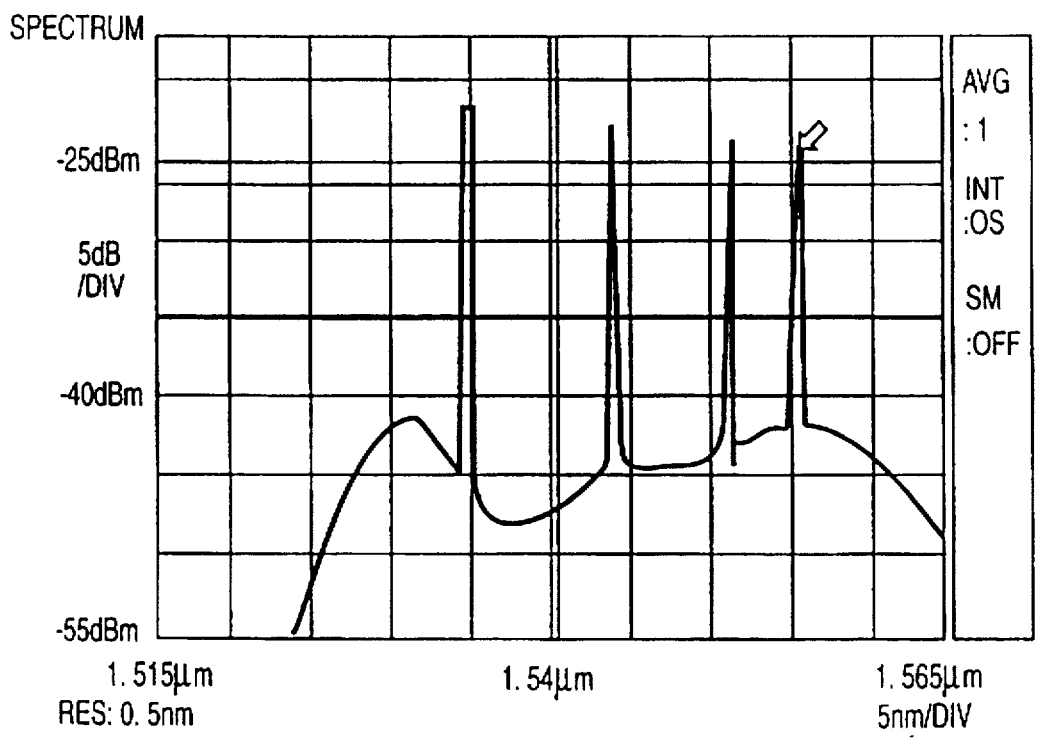
FIG. 12 shows the signal power levels at the input of the second line amplifier in the experimental system of FIG. 10.
Figure 13:
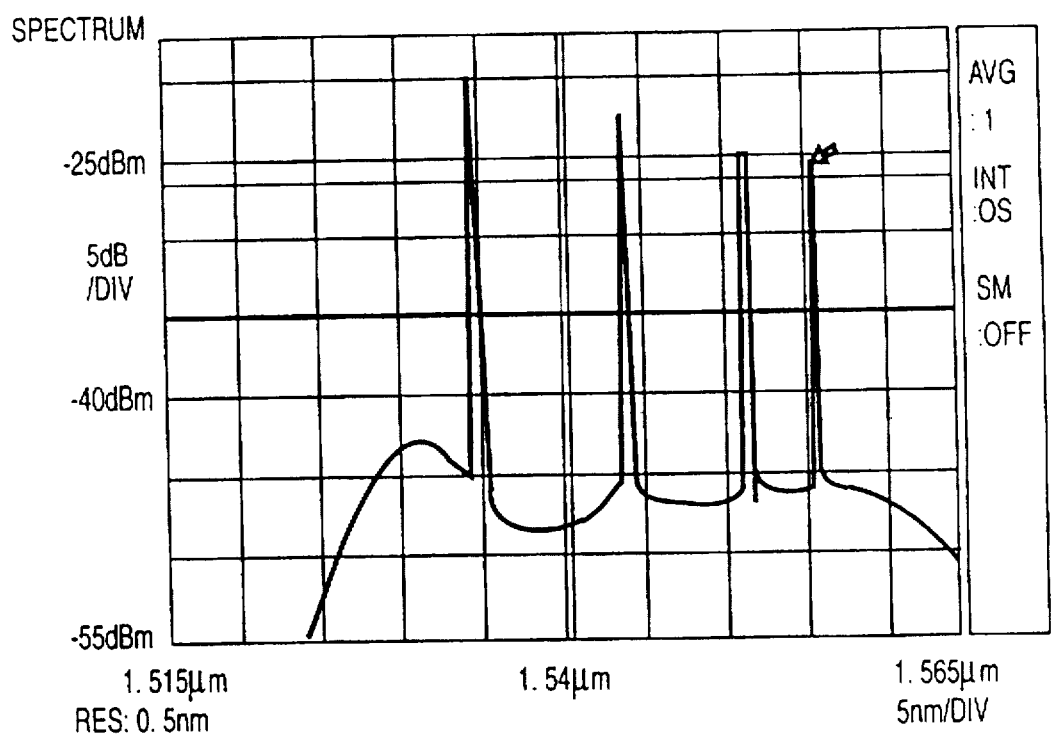
FIG. 13 shows the signal power levels at the input of the third line amplifier in the experimental system of FIG. 10.
Figure 14:
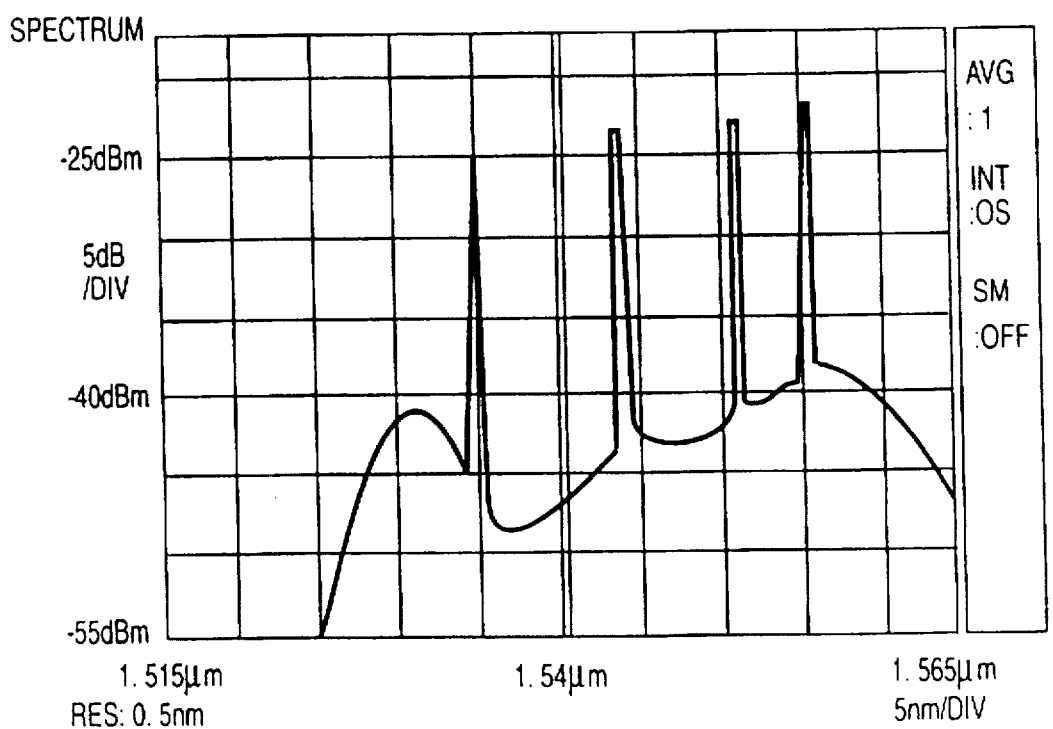
FIG. 14 shows the signal power levels at the input of the fourth line amplifier in the experimental system of FIG. 10.
Figure 15:
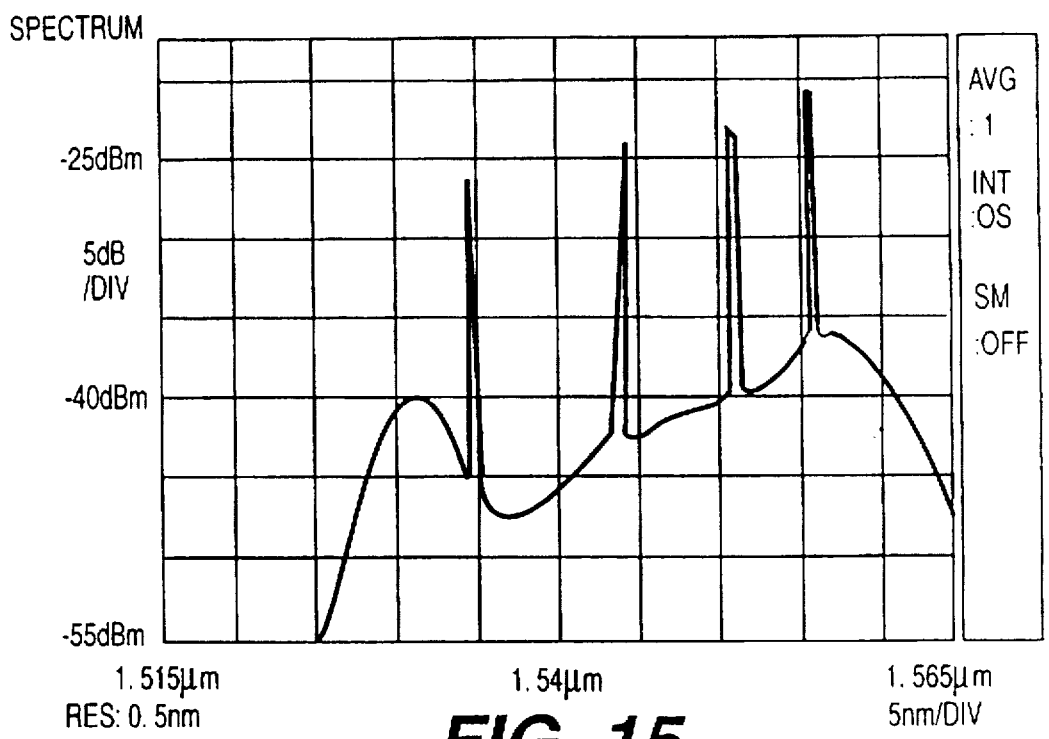
FIG. 15 shows the signal power levels at the preamplifier input in the experimental system of FIG. 10.

FIGS. 11 to 15 show the signal course in the subsequent stages, in particular at the input of amplifier 45, amplifier 45', amplifier 45" and amplifier 45'" respectively and at the input of the preamplifier 47. The pre-equalizer 43 applied a maximum starting pre-equalization of about 7 dB between the different channels, as shown in FIG. 11, to compensate for the saturation effects at the lower wavelengths taking place in cascade amplifiers. The pre-equalization was carried out in such a manner that the optical signal/noise (S/N) ratios at the preamplifier 47 exit could be equalized. In the subsequent amplification stages, one can see a reduction in the gain curve in the region having a smaller wavelength, due to the above described saturation phenomenon, whereas the optical S/N ratio of each of the channels remained high (S/N≧15 dB with $\Delta\lambda=0.5$ nm) until the preamplifier 47 exit.

Figure 16:
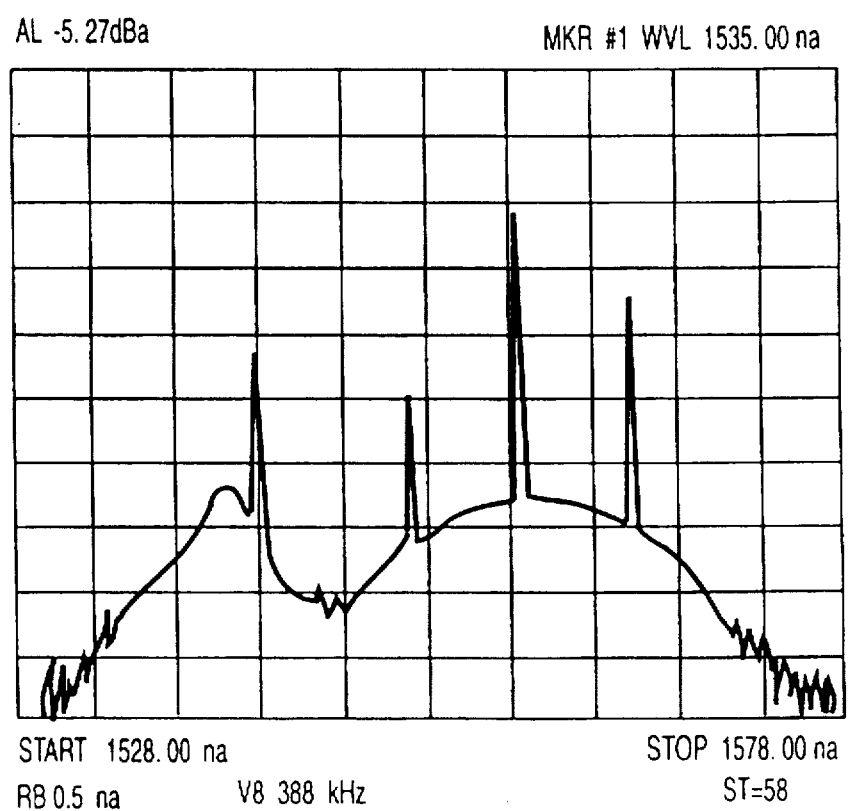
FIG. 16 shows the signal power-levels at the preamplifier input in the experimental system of FIG. 10, using amplifiers of a known type.

In a corresponding experiment carried out using amplifiers according to the diagram in FIG. 2 having an active fiber of the C type and a notch filter, an important reduction in the signal power at 1536 nm and 1544 nm was found, as well as a strong unbalance in the optical S/N ratios between the different channels, as is apparent from the graph in FIG. 16, showing the powers of the different channels at the preamplifier input. A still larger reduction can be found for a channel at about 1540 nm of wavelength.

In this case pre-equalization would have enabled the unbalance between the different channels (some of which appeared greatly reduced in respect of others and in particular those between about 1535 and 1540 nm) to be restrained. However, by carrying out such equalization, an acceptable S/N ratio for all signals in the wavelength band of interest could not be maintained at all events. In fact, to pre-equalize the channels a very high starting attenuation of the most favored channels=(1550 and 1556 nm), would be necessary which would have resulted in an S/N ratio of very low value (in the order of 8–10 dB), thereby making a correct reception of the signals themselves impossible.

The better results achieved with fiber type A as compared to the use of amplifiers provided with a notch filter and an Al/Ge/Er fiber are deemed to be due to the fact that fiber A has an emission curve practically clear of depressions or local a minimum of an important amount and in particular devoid of a minimum in the wavelength range contiguous to the emission peak, in the 1535–1540 nm zone. When several signals at different wavelengths are simultaneously fed to the fiber, the presence of a depression or local minimum in the emission curve (apparent in the spectra of the comparative fibers) causes a signal of a wavelength corresponding to the depression to be amplified to a smaller extent than the signals at the wavelengths of the adjacent ranges.

According to the above interpretation, the greater signal amplification at the wavelengths of adjacent ranges subtracts pumping energy to the signal itself which is saturated to a low output value (that is its level after amplification no longer depends on its input value, but only on the pump power available in the fiber), to increment the level difference between the different signals. In the presence of cascade amplifiers and in WDM transmissions, such a phenomenon is incremented at each stage and it is deemed to be responsive to the detected unevenness in the response, which cannot be compensated for by pre-equalization or the like.

It has been noted that the above phenomenon takes place for signals at the depression of the emission curve, due to the signal gain competition at wavelengths adjacent to the depression wavelength. This does not occur (at least to the same extent) for signals at wavelengths located at the limits of the useful band, although at such wavelengths the emission value may be absolutely equal to or lower than the value of the depression.

According to the present invention, the incorporation of lanthanum into an Al/Ge/Er fiber has unexpectedly eliminated such local emission minimum. This could not have been foreseen based on the available data for Al/La/Er and Al/Ge/Er fibers. In fact, both Al/La/Er and Al/Ge/Er fibers have an important emission depression in the 1535–1540 nm zone and knowing the performance of such known fibers would not have indicated a different, favorable behavior for an Al/Ge/La/Er fiber and in addition that such a fiber would have enabled amplified wavelength multiplexing transmission.

Unexpectedly, according to another and still more important aspect, it has been found that in the presence of a peak within a high-emission zone, the presence of the depression contiguous to the peak or at all events in functional (negative) relation with the adjacent zones, was responsible for an insufficient value in the signal/noise ratio for signals in the depression and that an active fiber capable of intrinsically eliminating or reducing the depression could solve the problem by enabling WDM transmission in the presence of one or more amplifiers. Therefore, according to the present invention, it has been found that an active fiber doped to give an emission curve having a relatively high value in a wavelength band, substantially clear of local depressions in a zone within the wavelength band in functional relation with the remaining zones of the band (that would generate an important gain difference for telecommunications signals at different wavelengths within the band of wavelengths multiplexed in the fiber itself) resulted in amplifiers particularly adapted to be used to provide high performance in a telecommunications line comprising at least two serial-connected optical amplifiers, with wavelength division multiplexed signals.

In another aspect, according to the present invention, it has been found that the S/N ratio control in transmission systems as referred to above, can be obtained not only with the use of filters or by adopting a transmission band of restricted width (capable of avoiding including disfavored wavelength zones), but through the dopant choice and dosing in the active fiber core of the amplifier, such that an emission curve may be drawn in a band wide enough (that is extended as far as 1525–1560 nm, or at least 1530–1560 nm) not to give rise to an disfavored signal amplification in one or more particular zones in the emission curve, although an emission peak is present in the band. Functional relation means, as above explained, that the presence of a greater emission in the zones adjacent to the depression, and in particular of an emission peak, and the presence of signals in the adjacent zones causes a reduction in the amplification of a signal at a wavelength corresponding to the depression.

An emission (or spectrum) curve has a relatively high value in a wavelength band when a given wavelength band, preferably between 1525 and 1560 nm, shows an emission of a value exceeding the emission outside the band to enable the amplification of a signal in the wavelength band. Such a zone is identified as the zone included between two end values, at which the emission is 3 dB lower than that at a wavelength included in the interval or band (preferably in a practically constant zone of the interval). In actual fact, such a band corresponds to that at which useful amplification can be carried out.

Emission peak is intended to mean an emission in a wavelength range which is greatly higher than in the spectrum zones outside such a range, so that different behaviors occur with respect to signals fed to the fiber at wavelengths within and outside this range. Important gain difference is intended to mean, for example, a difference higher than 2 dB between the most favored wavelength and the less favored wavelength in the band (at an input power equal to or lower than −20 dBm).

Local depressions of the emission curve is intended to mean a wavelength range within the band at which there is a secondary emission minimum, of a lower value than the emission value at either limit of the range and of a lower value by a predetermined amount than the maximum emission values in the contiguous wavelength ranges (in particular both the main emission peak of erbium, at wavelengths lower than the depression ones, and the secondary emission peak at higher wavelengths). For the purpose of the present invention, values of the predetermined depression amount which are higher than 0.5 dB and, more particularly, higher than 1 dB give noticeable effects.

It has been also found that, in a line amplifier used in a system provided with several cascade amplifiers, the use of a notch filter, while capable of restricting the intensity of the main emission peak by generating a substantially flat gain curve for the individual amplifiers, does not enable the above described phenomenon to be avoided. In fact, a notch filter, in a configuration involving several cascade amplifiers is deemed to constitute an attenuating element in the band zone at low wavelengths where it is centered. The effect inevitably extends to the depression zone of the emission curve. The attenuation effect arises in addition to the above described saturation phenomenon and generates a further penalization for a signal at a wavelength in such a depression or local minimum. The use of equivalent filter means adapted to attenuate or otherwise restrain the emission at the main peak, such as described in the above mentioned EP 426,222 for example, is deemed not to lead to important differences in performance.

For purposes of the present invention, the lanthanum content in the fiber core is preferentially higher than 0.1% by mole and the germanium content is higher than 5% by mole. The Ge/La ratio is preferably maintained at 50 and at all events included between 10 and 100. The presence of lanthanum in the fiber core enables a greater incorporation of germanium and alumina into the fiber, so that a high numerical aperture (higher than 0.18 and preferably at least equal to 0.2) is achieved, which brings about important advantages in terms of amplification efficiency and a more constant response in the band. The presence of lanthanum, in addition, enables the erbium content in the fiber to be increased without giving rise to clustering phenomena. The erbium content may be included between 20 and 5000 ppm, or more preferably between 100 and 1000 ppm.

While described in detail with reference to the use in line amplifiers, the fibers in accordance with the present invention can conveniently also be employed in a preamplifier. Such an amplifier is preferably sized for receiving a signal of very low intensity (−50 dBm for example) and amplifying it before it is sent to a receiving device. In addition it is noted that, while optical two-stage amplifiers have been described which use two successive and separately pumped portions of active fiber, in accordance with the present invention single-stage amplifiers may also be made, for example following the construction diagrams shown in the aforementioned EP 426,222 and EP 439,867 patents and amplifiers different in type from each other, for example mono-stage and two-stage amplifiers, can be used together in one and the same connection.

In addition, for specific requirements, in two-stage amplifiers it is possible that only one of them be made with the fiber of the present invention.

On the other hand, a person skilled in the art, taking into account the above considerations, will be able to identify specific operating conditions and specific dopant contents adapted to the intended application for the purpose of achieving the states response results.

Within the present invention, a person skilled in the art operating with fibers containing a main dopant (preferably erbium when the telecommunications field is concerned) which is fluorescent in the wavelength range of interest, in combination with secondary dopants interacting therewith in an additive or interoperative manner, will be able to identify specific dopants or combinations thereof and relevant dosages, in order to obtain variations in the emission curve of the fiber, and corresponding performances of amplifiers and amplified systems made thereby (lasers, optical gyroscopes, and the like, as well as transmission, telecommunications or measurement systems embodying them) in order to obtain the desired performance in terms of signal/noise ratio within the band of interest. In the specific field which is particularly of interest for the Applicant, the research has been limited to erbium as the main fluorescent dopant, and to Ge, Al, and La incorporated into the fiber in the form of oxides, as the secondary dopants, because the results of this research have been sufficient to solve the specific technical problems.

The teachings given in the present invention will be used by a person of ordinary skill in the art in order to solve problems which may be similar to, or different from, those herein described, provided that they have the same technical grounds, through the research of specific different dopants or particular dosages as herein experimented and described, putting into practice or using the same functional relation between results and employed means.

What is claimed is:

1. An active optical fiber for use in a laser-pumped optical telecommunications amplifier comprising:

a core;

at least one main fluorescent dopant in said core; and at least one secondary dopant in said core, said main dopant said secondary dopant having relative characteristics such that emission power of the fiber in a predetermined wavelength band includes a main emission peak and a secondary emission peak when optical pumping energy is supplied to the fiber, the emission power at the secondary emission peak not exceeding by more than 1 dB the emission power at all wavelengths between the main emission peak and the secondary emission peak, wherein said main fluorescent dopant is erbium in the form of an oxide, and wherein said secondary dopant includes an oxide of aluminium, an oxide of germanium, and an oxide of lanthanum.

2. An active optical fiber according to claim 1, wherein the lanthanum content in the fiber core expressed as an oxide is higher than 0.1% by mole.

3. An active optical fiber according to claim 1, wherein the lanthanum content in the fiber core expressed as an oxide is equal to or greater than 0.2% by mole.

4. An active optical fiber according to claim 1, wherein the germanium content in the fiber core expressed as an oxide is higher than 5% by mole.

5. An active optical fiber according to claim 4, wherein the molar ratio between the lanthanum content and germanium content in the fiber core expressed as oxides, is between 10 and 100.

6. An active optical fiber according to claim 4, wherein the molar ratio between the lanthanum content and germanium content in the fiber core expressed as oxides is about 50.

7. An active optical fiber according to claim 1, wherein the aluminium content in the fiber core, expressed as an oxide is higher than 1% by mole.

8. An active optical fiber according to claim 1, wherein the aluminium content in the fiber core expressed as an oxide is higher than 2% by mole.

9. An active optical fiber for use in a laser-pumped optical telecommunications amplifier comprising:

a core;

at least one main fluorescent dopant in said core; and at least one secondary dopant in said core, said main dopant and said secondary dopant having relative characteristics such that emission power of the fiber in a predetermined wavelength band includes a main emission peak and a secondary emission peak when optical pumping energy is supplied to the fiber, the emission power at the secondary emission peak not exceeding by more than 1 dB the emission power at all wavelengths between the main emission peak and the secondary emission peak, and wherein the erbium content in the fiber core expressed as an oxide is between 20 and 5000 ppm by mole.

10. An active optical fiber for use in a laser-pumped optical telecommunications amplifier comprising:

a core;

at least one main fluorescent dopant in said core; and at least one secondary dopant in said core, said main dopant and said secondary dopant having relative characteristics such that emission power of the fiber in a predetermined wavelength band includes a main emission peak and a secondary emission peak when optical pumping energy is supplied to the fiber, the emission power at the secondary emission peak not exceeding by more than 1 dB the emission power at all wavelengths between the main emission peak and the secondary emission peak, and wherein the numerical aperture of the fiber is higher than 0.15.

11. An active optical fiber comprising a core doped with a main fluorescent dopant and a secondary dopant, said main fluorescent dopant comprising erbium oxide and the secondary dopant comprising an oxide of aluminium, an oxide of germanium and an oxide of lanthanum.

12. An active optical fiber according to claim 11, wherein the lanthanum content of the fiber core is higher than 0.1% by mole.

13. An active optical fiber according to claim 12, wherein the germanium oxide content of the fiber core is higher than 5% by mole.

14. An active optical fiber according to claim 13, wherein the aluminum oxide content of the fiber core is higher than 1% by mole.

15. An active-fiber optical amplifier, comprising:

at least one length of silica-based active fiber;

a pump for supplying optical pumping power at a pumping wavelength to said active fiber;

a coupler coupling said optical pumping power and at least one transmission signal at a transmission wavelength to said active fiber, a predetermined transmission band including said transmission wavelength;

said active optical fiber having a core doped with at least one main fluorescent dopant and at least one secondary dopant, said main fluorescent dopant and said secondary dopant having relative characteristics such that a maximum gain variation between any and all two different transmission wavelengths in said predetermined transmission band measured at an input power less than or equal to −20 dBm, is lower than 2.5 dB, wherein the predetermined transmission band includes 1535 nm to 1545 nm.

16. An active-fiber optical amplifier according to claim 15, wherein said main fluorescent dopant is an oxide of erbium.

17. An active-fiber optical amplifier comprising:

at least one length of silica-based active fiber;

a pump for supplying optical pumping power at a pumping wavelength to said active fiber;

a coupler within said active fiber to couple said optical pumping power and at least one transmission signal, at a transmission wavelength included in a predetermined transmission band, to said active fiber;

said active optical fiber having a core doped with at least one main fluorescent dopant and at least one secondary dopant, said main fluorescent dopant and said secondary dopant having relative characteristics such that a maximum gain variation between two signals at different transmission wavelengths in said predetermined transmission band measured at an input power less than or equal to −20 dBm, is lower than 2.5 dB, wherein said main fluorescent dopant is an oxide of erbium, and wherein said secondary dopant comprises oxides of aluminium, germanium, and lanthanum.

18. An active-fiber optical amplifier according to claim 15, wherein emission power of the fiber in said predetermined transmission band includes a main emission peak and a secondary emission peak, the emission power at the secondary emission peak not exceeding by more than 1 dB the emission power at all wavelengths between the main emission peak and the secondary emission peak.

19. An active-fiber optical amplifier according to claim 18, wherein said emission curve has depressions of a value not higher than 0.5 dB with respect to the emission value in at least one of the adjacent zones in said band.

20. An active-fiber optical amplifier according to claim 15, wherein said predetermined transmission band is between 1525 and 1560 nm.

21. An active-fiber optical amplifier according to claim 15, wherein said active fiber has a numerical aperture greater than 0.15.

22. An active fiber optical amplifier, comprising:

a first silica-based active-fiber;

a first pump for supplying optical pumping power at a first pumping wavelength to said first active fiber;

a first coupler for coupling the optical pumping power of said first pump and a first transmission signal at a first transmission wavelength included in a predetermined transmission band to said first active fiber;

a second silica-based active fiber;

a second pump for supplying optical pumping power at a second pumping wavelength to said second active fiber;

a second coupler for coupling the optical pumping power of said second pump and a second transmission signal at a second wavelength included in said predetermined transmission band to said second active fiber;

wherein at least one of said first active fiber and said second active fiber includes a core doped with a main fluorescent dopant and at least one secondary dopant, said main and secondary dopants having relative characteristics such that a maximum gain variation between any and all two different transmission wavelengths for said first transmission signal and said second transmission signal measured at an input power less than or equal to −20 dBm is lower than 2.5 dB, wherein the predetermined transmission band includes 1535 nm to 1545 nm.

23. An active fiber optical amplifier comprising:

at least one length of silica-based active fiber;

a pump for supplying optical pumping power at a pumping wavelength to said active fiber;

a coupler within said active fiber to couple said optical pumping power and at least one transmission signal, at a transmission wavelength included in a predetermined transmission band, to said active fiber;

said active optical fiber having a core doped with at least one main fluorescent dopant and at least one secondary dopant, said main fluorescent dopant and said secondary dopant having relative characteristics such that a maximum gain variation between two signals at different transmission wavelengths in said predetermined transmission band measured at an input power less than or equal to −20 dBm, is lower than 2.5 dB, wherein said predetermined transmission band is between 1525 and 1560 nm, and wherein said main fluorescent dopant is an oxide of erbium and said secondary dopant includes an oxide of aluminium, an oxide of germanium, and an oxide of lanthanum.

24. An active-fiber optical amplifier according to claim 19, characterized in that said active fiber has a numerical aperture greater than 0.15.

25. An active-fiber optical amplifier, comprising:
   at least one length of silica-based active fiber;
   a pump for said active fiber to provide optical pumping power;
   a coupler within said active fiber to couple said pumping power and at least one transmission signal, at a transmission wavelength included in a predetermined transmission wavelength band, to said active fiber, said active fiber having a core doped with at least one main fluorescent dopant and at least one secondary dopant, said main fluorescent dopant and said secondary dopant having relative characteristics such that an emission curve of the active fiber in said predetermined transmission wavelength band is substantially clear of a depression having a lower emission value than at adjacent wavelengths in said predetermined transmission wavelength band, where the amplification for a signal at a depression wavelength in said emission curve is saturated at a lower output value in the presence of signals at said adjacent wavelengths outside the depression.

26. A telecommunications system for transmitting optical signals in a predetermined wavelength band from a transmission station to a receiving station, comprising:
   an optical fiber adapted to connect the transmission station and receiving station; and
   at least two active-fiber optical amplifiers connected in series along said optical fiber;
   at least one of said optical amplifiers comprising a silica-based active optical fiber having a core doped with at least one main fluorescent dopant and at least one secondary dopant in appropriate amounts such that the receiving station receives signals with an optical signal/noise ratio, measured at a 0.5 nm filter width, greater than or equal to 15 dB for signals of a wavelength included in said predetermined wavelength band, wherein the secondary dopant includes an oxide of lanthanum.

27. A telecommunication system according to claim 26, wherein at least two signals at different wavelengths are included in said predetermined wavelength band and are simultaneously fed to said at least one of said optical amplifiers.

28. A telecommunication system according to claim 26, wherein said main fluorescent dopant is an oxide of erbium.

29. A telecommunication system according to claim 28, wherein said secondary dopant includes an oxide of aluminium and, an oxide of germanium.

30. A telecommunication system according to claim 28, wherein the predetermined transmission band is between 1530 and 1560 nm.

31. A telecommunication system according to claim 26, further including a third optical amplifier connected in series along the optical fiber.

32. A telecommunication system according to claim 31, wherein at least one of said three serially connected amplifiers has an active fiber, the core of said active fiber being doped with an oxide of aluminium, an oxide of germanium, an oxide of lanthanum, and an oxide of erbium.

33. An optical telecommunication method comprising the steps of:
   generating at least one optical signal at a predetermined wavelength in a wavelength band;
   supplying the optical signal to a length of an optical fiber for transmission therein within an optical telecommunication line;
   providing in the length of the optical fiber an active-fiber optical amplifier including an active fiber doped with a main fluorescent dopant and at least one secondary dopant interacting with the main dopant in the active fiber to generate an amplification gain of the optical signal at the predetermined wavelength in the active-fiber optical amplifier, measured at an input power less than or equal to $-20$ dBm, differing by less than 1.6 dB from the corresponding gain of any and all signals at a different wavelength in the band, wherein the predetermined transmission band includes 1535 nm to 1545 nm;
   amplifying the optical signal at least once in the length of the optical fiber by at least one active-fiber optical amplifier; and
   receiving the at least once amplified optical signal through a receiver.

34. A telecommunication method according to claim 33, wherein at least two signals at different wavelengths are included in the predetermined wavelength band and are simultaneously fed to said optical amplifier.

35. A telecommunication method according to claim 33, further including amplifying the optical signal at least twice by providing at least two active-fiber optical amplifiers in the length of the optical fiber.

36. A telecommunication method according to claim 33, wherein the wavelength band extends from 1530 to 1560 nm.

37. A telecommunication method according to claim 33, wherein the wavelength band extends from 1525 to 1560 nm.

38. A telecommunication method according to claim 33, wherein erbium is the main fluorescent dopant.

39. A telecommunication method according to claim 38, wherein the secondary dopants include an oxide of aluminium, an oxide of germanium, and an oxide of lanthanum.

* * * * *

UNITED STATES PATENT AND TRADEMARK OFFICE
CERTIFICATE OF CORRECTION

PATENT NO.: 5,748,364

DATED: May 5, 1998

INVENTOR(S): Meli et al.

It is certified that an error appears in the above-identified patent and that said Letters Patent is hereby corrected as shown below:

Claims, column 16, line 16, after "dopant" insert --and--; and column 20, line 50, after "to" insert --claim--.

Signed and Sealed this

Eighteenth Day of August, 1998

*Attest:*

BRUCE LEHMAN

*Attesting Officer*  *Commissioner of Patents and Trademarks*